United States Patent
Shimotoyodome

(10) Patent No.: US 6,460,257 B1
(45) Date of Patent: Oct. 8, 2002

(54) SCRIBING METHOD AND APPARATUS

(75) Inventor: Gyo Shimotoyodome, Tokyo-to (JP)

(73) Assignees: THK Co., Ltd., Tokyo-to (JP); Beldex Corporation, Tokyo-to (JP)

(*) Notice: Subject to any disclaimer, the term of this patent is extended or adjusted under 35 U.S.C. 154(b) by 0 days.

(21) Appl. No.: 09/527,248

(22) Filed: Mar. 17, 2000

(30) Foreign Application Priority Data

Mar. 18, 1999 (JP) .......................................... 11-073237

(51) Int. Cl.[7] ......................... C03B 33/02; B43L 13/00
(52) U.S. Cl. ................................. 33/18.1; 33/DIG. 2
(58) Field of Search ................................. 33/18.1, 18.2, 33/26, 27.01, 28, 32.1, 32.3, 32.4, 32.5, 32.6, DIG. 2

(56) References Cited

U.S. PATENT DOCUMENTS

| | | | |
|---|---|---|---|
| 3,122,953 A | | 3/1964 | Atkeson |
| 3,673,900 A | | 7/1972 | Jendrisak et al. |
| 3,818,597 A | * | 6/1974 | Schmied ............... 33/18.1 |
| 3,818,769 A | * | 6/1974 | Tigner et al. ........... 33/18.2 |
| 4,015,269 A | * | 3/1977 | Edo ..................... 33/18.1 |
| 5,195,410 A | * | 3/1993 | Young ................... 83/13 |
| 5,820,006 A | * | 10/1998 | Turner .................. 83/882 |
| 6,021,574 A | * | 2/2000 | Murray, III ............ 33/18.1 |

FOREIGN PATENT DOCUMENTS

| | | |
|---|---|---|
| EP | 0 126 037 | 11/1984 |
| EP | 0 905 097 | 3/1999 |
| WO | WO 00/41862 | 7/2000 |
| WO | WO 00/41863 | 7/2000 |

OTHER PUBLICATIONS

Copy of European Patent Office Communication including European Search Report for corresponding European Patent Application 00302191 dated Feb. 9, 2001.

* cited by examiner

*Primary Examiner*—Christopher W. Fulton
(74) *Attorney, Agent, or Firm*—Armstrong, Westerman & Hattori, LLP

(57) ABSTRACT

A scribing apparatus for forming a scribe line on a surface of a work comprises a scribe body provided with an abutment member having a sharpened tip and a vibration generating device for applying a vibration to the abutment member, a support member for supporting the scribe body to be movable in a direction crossing the surface of the work, and an impact applying device for applying an impact to the scribe body. The impact applying device comprises an air-cylinder assembly supported by the support member, the air-cylinder assembly having a rod having an end portion to be brought into contact with the scribe body to thereby apply the impact to the abutment member.

6 Claims, 8 Drawing Sheets

SCRIBING METHOD AND APPARATUS

BACKGROUND OF THE INVENTION

The present invention relates to a scribing method and apparatus for forming or scribing a scribe line on a surface of a work (workpiece) of a brittle material such as plate glass, ceramics plate or the like.

In a known art, the Japanese Patent Laid-open Publication No. HEI 9-25134 discloses a scribing apparatus for forming a scribe line on a brittle material while applying a vibration thereto.

This known scribing apparatus has a structure in which an air-cylinder assembly includes an outer cylinder fixed to a support, an inner cylinder connected to one end of a vibration generating member, and a cutter holder connected to another end of the vibration generating member, the cutter holder being mounted on the support to be slidable. According to such structure, the air-cylinder assembly operates to urge the cutter holder so as to push the cutter held by the cutter holder against a work surface, and in such state, a high frequency voltage is applied to the vibration generating member to vibrate the cutter, thus forming the scribe lines on the work surface.

When the scribe line is scribed by using the scribing apparatus mentioned above, the scribing operation starts from an edge portion of the work surface, and in this operation, the edge portion of the work surface is locally destroyed by the vibration of the cutter. The scribe line is then scribed from this locally destroyed portion. That is, during the movement of the cutter along the work surface, the work surface is beaten or tapped at minute distances or intervals by the vibration of the cutter to thereby generate vertical cracks, which are grown from the locally destroyed portion as a base (or starting) portion of the scribe line.

In the conventional scribing method and apparatus mentioned above, for example, even in a case where it is desired to scribe a scribe line constituting a closed curved line, it is necessary to start the scribing operation from the edge portion of the work surface, which is essentially not necessary in such curved scribing line operation, and accordingly, the scribing operation takes much extra time.

In order to obviate such defect, it may be considered to start the scribing operation from a portion of the work surface apart from the edge portion. However, in such case, starting the growth of the vertical crack by the vibration of the cutter, so that a deep and good scribe line is formed is difficult. Furthermore, in a case of scribing a scribe line on a hard work, even if the cutter beats the work surface by the vibration, the cutter merely slides and moves on the work surface without scribing any scribe line, thus also causing a problem.

SUMMARY OF THE INVENTION

An object of the present invention is to substantially eliminate defects or drawbacks encountered in the prior art mentioned above and to provide a scribing method and apparatus for scribing a scribe line in good condition in a short time.

This and other objects can be achieved according to the present invention by providing, in one aspect, a method of forming a scribe line on a surface of a work by using a scribing apparatus having a scribe body provided with an abutment member having a sharpened tip, and a vibration generating device for applying a vibration to the abutment member, wherein a base crack is formed on a scribing base point apart from an edge portion of the surface of the work, and the scribe line is formed with the base crack being an initial crack of the cracks forming the scribe line.

The base crack may be formed by applying an impact to the scribe body. More actually, the abutment member may be moved directly above the scribing base point by relatively moving the scribe body along the work surface in a state separated from the work surface. The scribe body may be lowered to allow the tip of the abutment member to abut against the scribing base point by a dead weight of the scribe body, and thereafter, the impact may be applied to the scribe body.

The scribing base point may substantially correspond with a scribing finishing point to thereby describe a closed curve line.

In another aspect of the present invention, there is provided a scribing apparatus for forming a scribe line on a surface of a work comprising a scribe body provided with an abutment member having a sharpened tip and a vibration generating device for applying a vibration to the abutment member, a support member for supporting the scribe body to be movable in a direction crossing the surface of the work, and an impact applying device for applying an impact to the scribe body.

The impact applying device may comprise an air-cylinder assembly supported by the support member, the air-cylinder assembly having a rod having an end portion to be brought into contact with the scribe body to thereby apply the impact to the abutment member.

The scribing apparatus may further comprise: a positioning device for moving one of the scribe body and the work in a direction along the surface of the work so as to locate the abutment member of the scribe body on a position at which the abutment member confronts a scribing base point formed at a portion apart from an edge portion of the work surface; a contacting/separating device for contacting or separating the sharpened tip of the abutment member to or from the work surface by moving one of the scribe body and the work in a direction crossing the work surface; a moving device for moving at least one of the scribe body and the work to relatively move the abutment member along a predetermined line to be scribed on the work surface; and a control device operatively connected to the contacting/separating device, the positioning device, the impact applying device, the moving device, and the vibration generating device to control the operations thereof to scribe the predetermined scribe line on the work surface, and the control device may control the contacting/separating device and the positioning device so as to oppose the abutment member to the scribing base point on the work surface while separating the abutment member from the work surface, control the contacting/separating device to abut the sharpened tip of the abutment member against the work surface, control the impact applying device so as to apply the impact to the scribe body, and control the moving device so as to scribe a predetermined scribe line on the work surface while controlling the vibration generating device to apply the vibration to the abutment member.

According to the present invention and structures mentioned above, since the scribing base point is set to a portion apart from the edge portion of the work to be scribed, it is not necessary to scribe an extra line, and hence, it is possible to scribe the scribe line, such as a closed curve line, in a short time, shortening the scribing work. Furthermore, the base crack is formed on the scribing base point by which the growth of the vertical crack can be promoted through the vibration to thereby scribe the scribe line.

The base crack can be easily formed by applying the impact by the air-cylinder assembly constituting the impact applying device. The scribing operations can be preferably controlled by the control device.

The nature and further characteristic features of the present invention will be made more clear from the following description made with reference to the accompanying drawings.

DESCRIPTION OF THE PREFERRED EMBODIMENTS

A preferred embodiment of a scribing apparatus according to the present invention will be described below with reference to the accompanying drawings. Further, it is first to be noted that terms described herein for showing positions, directions or like, such as "vertical", "horizontal", "upper", "lower" or like, are used in an assumption that the scribing apparatus is installed as actually illustrated.

Figure 1:
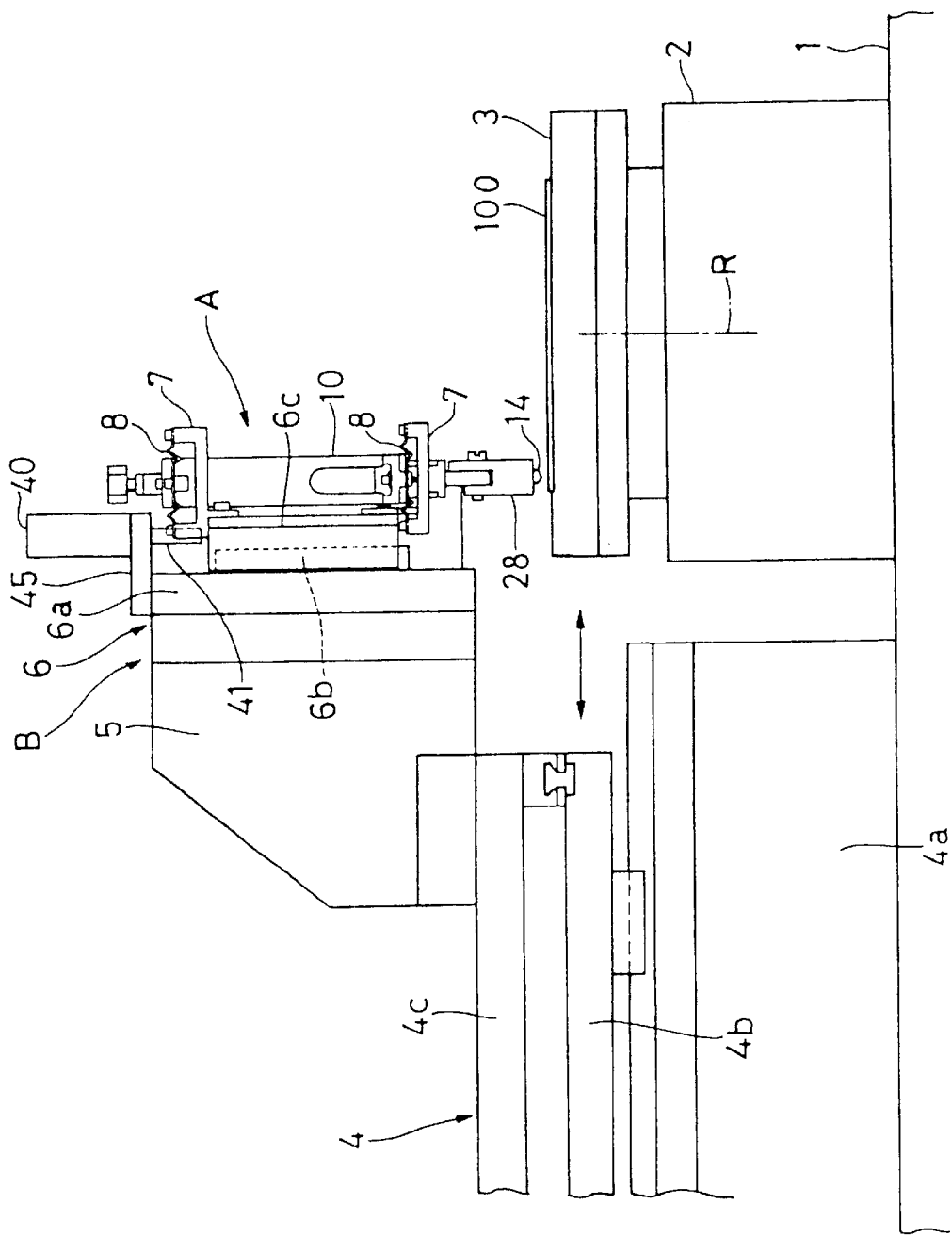
FIG. 1 is a schematic side view showing an entire structure of a scribing apparatus according to one embodiment of the present invention.
Figure 2:
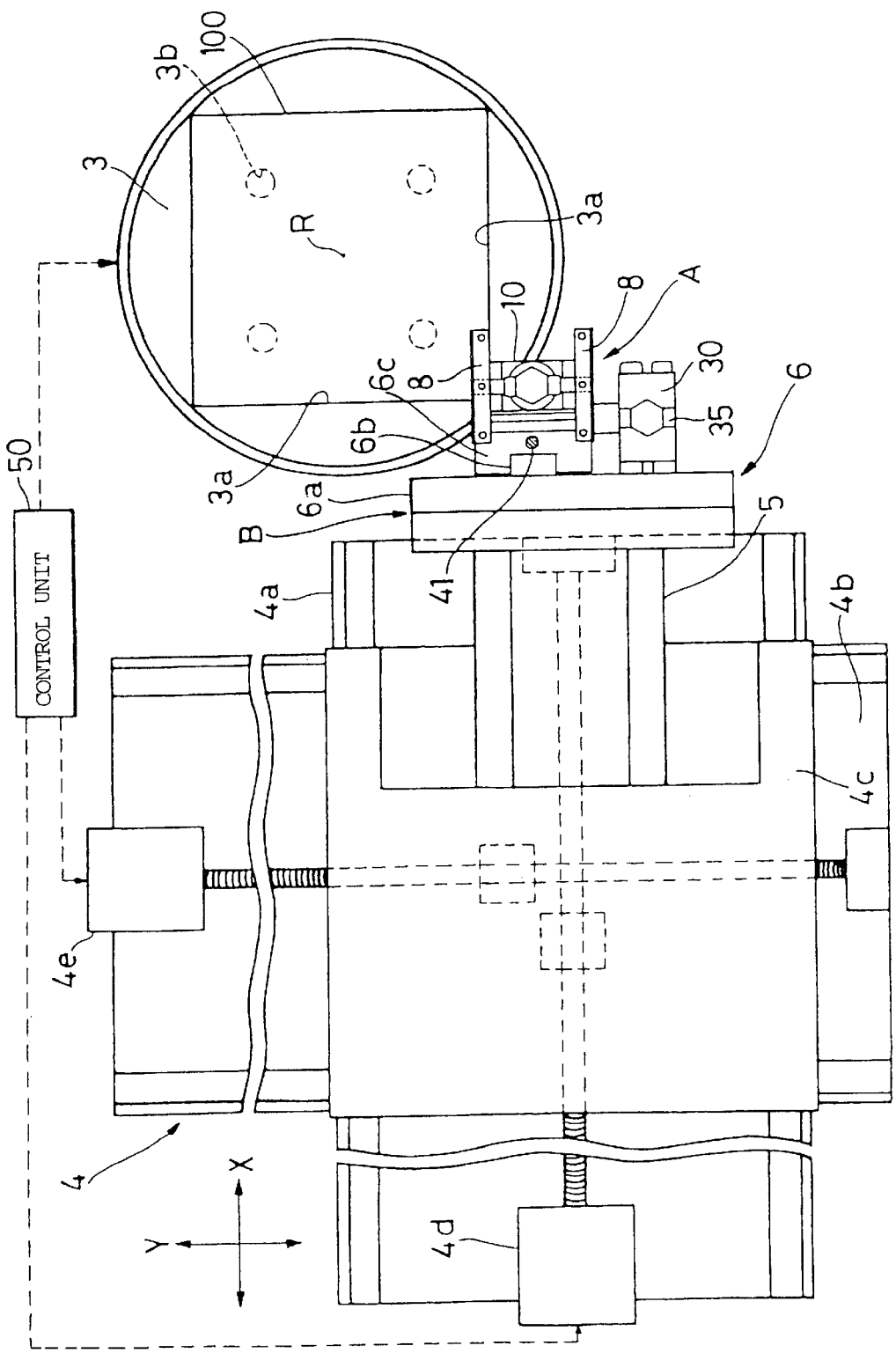
FIG. 2 is a plan view of the scribing apparatus of FIG. 1.

First, with reference to FIGS. 1 and 2, a scribing apparatus comprises a rotation mechanism 2 (rotating means or moving means) mounted on a base frame 1, a table 3 mounted on the rotational mechanism 2, an X-Y stage 4 (positioning means) disposed by the side of the rotation mechanism on the base frame 1, and a scribe body A supported by the X-Y stage 4 through a bracket 5 to be vertically movable.

The table 3 is provided for placing a plate-shaped work (or workpiece) 100 such as plate glass, ceramics plate or the like in a horizontal manner. That is, as shown in FIG. 2, two positioning surfaces 3a, 3a extending linearly and crossing at right angles to each other are formed on the upper surface of the table 3. The work 100 has, for example, a rectangular shape, and is placed and positioned on the table 3 in a state that two sides of the rectangular work 100 abut against the two positioning surfaces 3a. The upper surface of the table 3 is formed with a plurality of suction holes 3b, four holes in FIG. 2, and at a time when the scribing operation is executed in a manner mentioned below, a vacuum device, not shown, communicated with suction holes 3b is driven to thereby suck and then hold the work 100 on the table 3.

The table 3 is rotated by the rotation mechanism 2 in a horizontal plane.

The X-Y stage 4 comprises a base 4a, a first movable table 4b mounted on the base 4a to be horizontally movable in an X-axis direction and a second movable table 4b mounted on the first movable table 4b to be horizontally movable in a Y-axis direction. The first and second movable tables 4b and 4c are driven and moved by driving mechanisms 4d and 4e, respectively, which have known structures.

As shown in FIGS. 3 to 7, the scribe body A comprises a body portion 10, a holder 12 supported by the body portion 10 so as to be minutely slidable in a vertical direction, a cutter 14 (head or abutment member) attached to the lower end of the holder 12, and two vibration generating members 16,16, each of which consists of a piezo-actuator or the like applying vertical vibration to the holder 12.

The body portion 10 of the scribe body A is supported by the bracket 5 through the slide mechanism 6. The slide mechanism 6 comprises a base plate 6a vertically fixed to the bracket 5, a guide 6b fixed to the base plate 6a so as to extend vertically and a slider 6c supported by the guide 6b to be vertically slidable.

The slider 6c constitutes one portion of the scribe body A, and the bracket 5, the base plate 6a and the guide 6b constitute a support member B.

Figure 5:
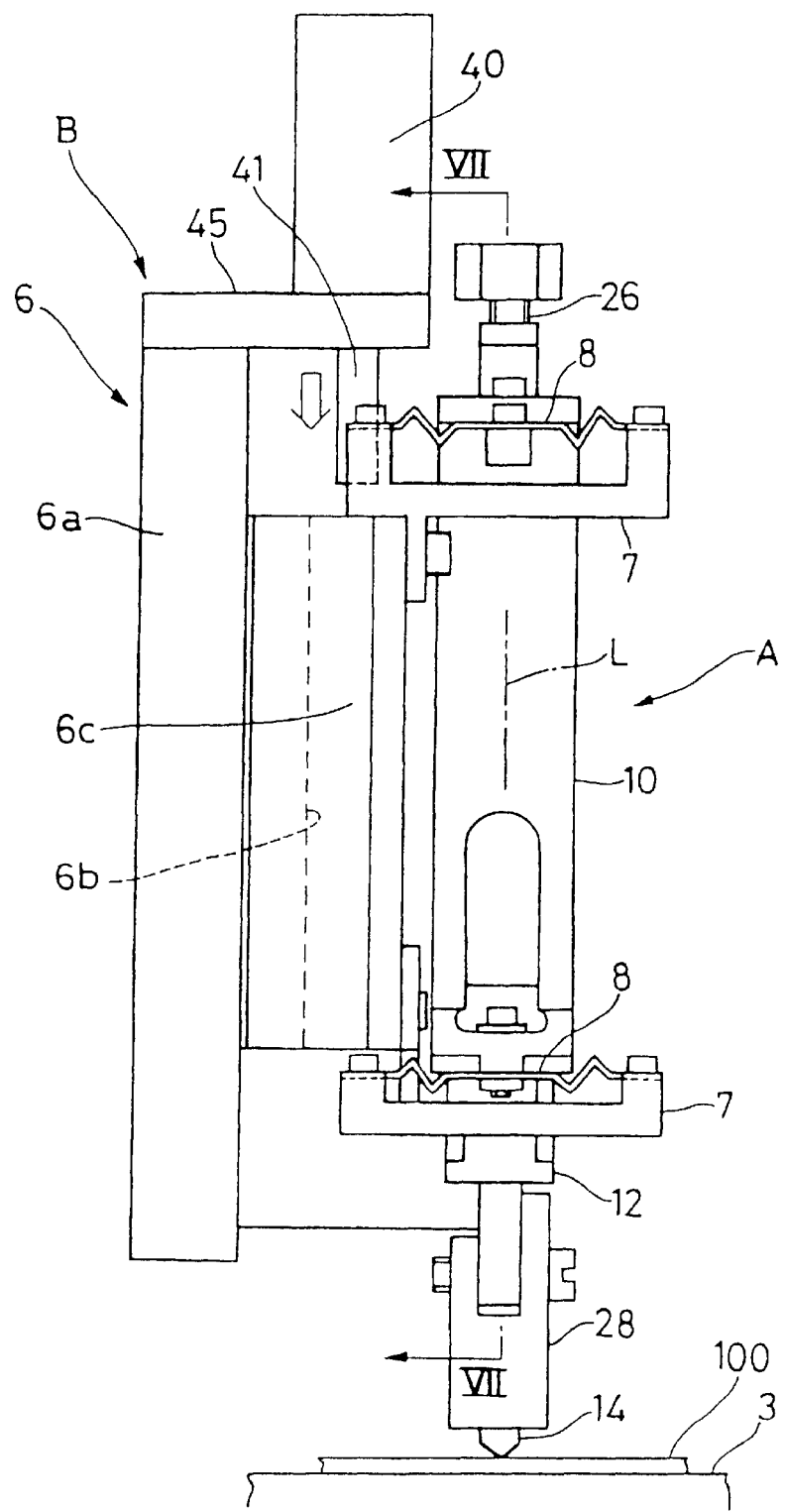
FIG. 5 is a side view of FIG. 4.
Figure 6:
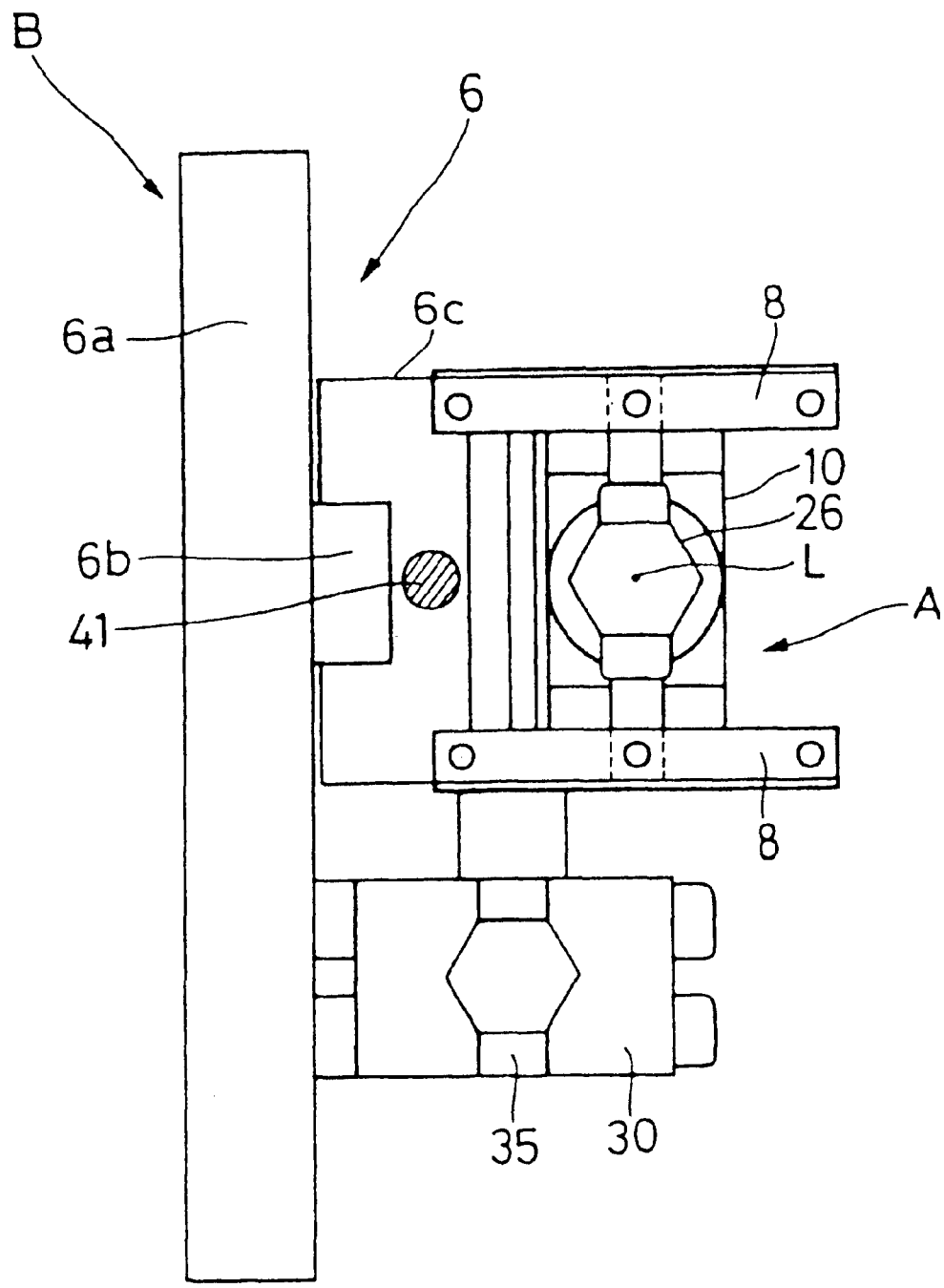
FIG. 6 is a plan view, in an enlarged scale, of an essential portion of the scribing apparatus, in which only a rod of an air-cylinder assembly for applying vibration is shown in section.

As best shown in FIG. 5, four sheets of plate springs 8, which are referred to as vibration buffer members having elasticity, are attached to the slider 6c through brackets 7, and the body portion 10 mentioned above is supported by the plate springs 8.

The body portion 10 has a vertically elongated box-shape, in which the holder 12 is accommodated. The holder 12 also has a vertically elongated box-shape, in which the vibration generating members 16 are housed.

Figure 7:
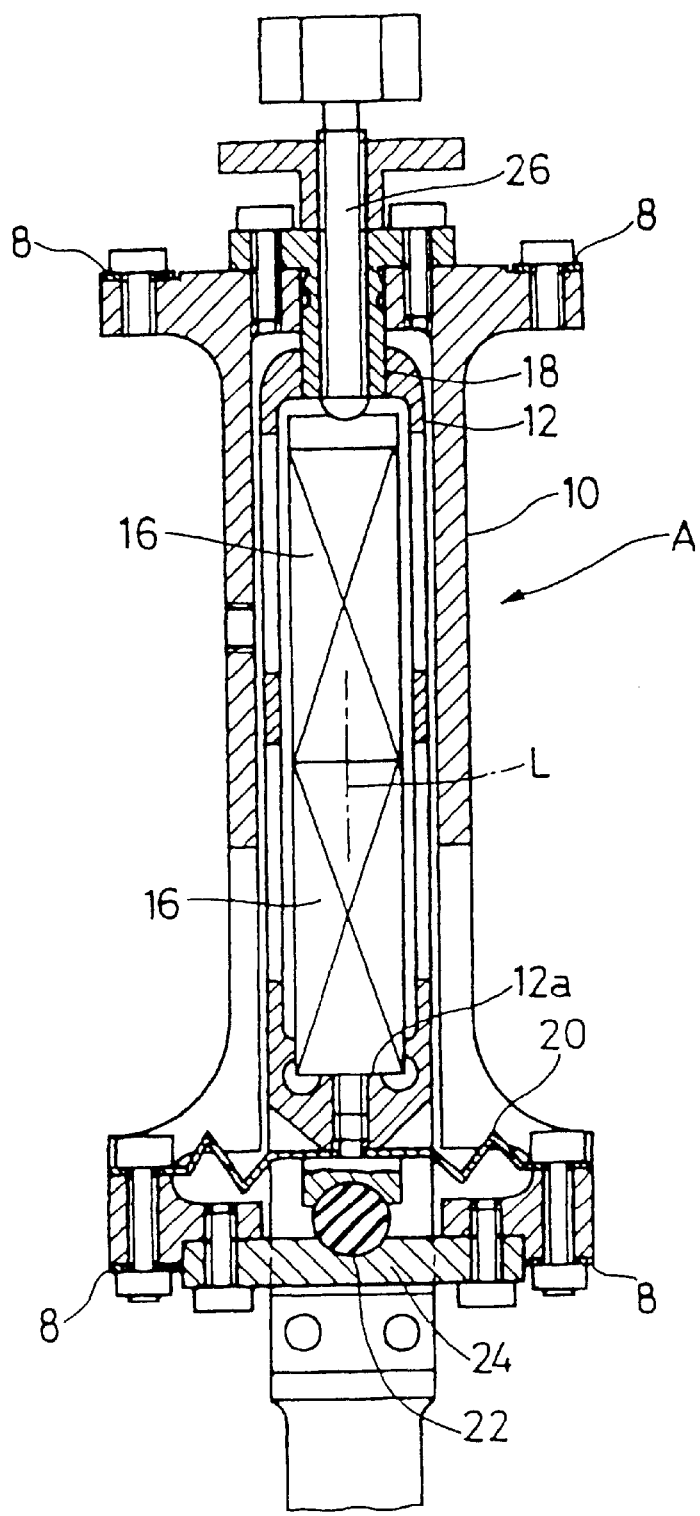
FIG. 7 is a cross sectional view of the scribe body taken along the line VII—VII in FIG. 5.

Each vibration generating member 16 has a vertically elongated shape and is disposed coaxially with the body portion 10 and the holder 12 to generate the axial vibration, the central axis thereof being shown with a letter L in the drawing. As shown in FIG. 7, the lower end surface of the lower side vibration generating member 16 abuts on a bottom surface 12a (abutting surface) of an inner space of the holder 12.

With reference to FIG. 7, the holder 12 has an upper end portion which is supported by a guide member 18 mounted on an upper end portion of the body portion 10 to be minutely slidable in a vibrating direction along the central axis (line) L.

The holder 12 also has a lower end portion which is supported by a plate spring 20 mounted on the body portion 10 and a spherical ball 22, referred to as load applying member, formed of an elastic material such as rubber or resin. The ball 22 is disposed between the holder 12 and a receiving plate 24 fixed to the body portion 10.

The ball 22 urges upward the holder 12 by its elastic restoring force to thereby apply a pre-load (a force in a direction for axially compressing the vibration generating members 16) to the vibration generating member 16s between the bottom surface 12a of the inner space of the holder 12 and an adjusting screw 26 screwed into the guide member 18.

The holder 12 has a fork-shaped portion (a pair of extensions) extending downward so as to straddle the plate spring 20, and the cutter 14 is attached to the lower (front) end portion of the extended portion of the holder 12 through an attachment 28. The cutter 14 is positioned on the central axis line L of the vibration generating members 16, and the cutter 14 has a lower end (tip) having a sharp conical shape.

A diamond particle is secured to the lower end of the cutter 14 so that the apex of the diamond particle is directed downward so as to abut against the surface of the work 100.

Figure 3:
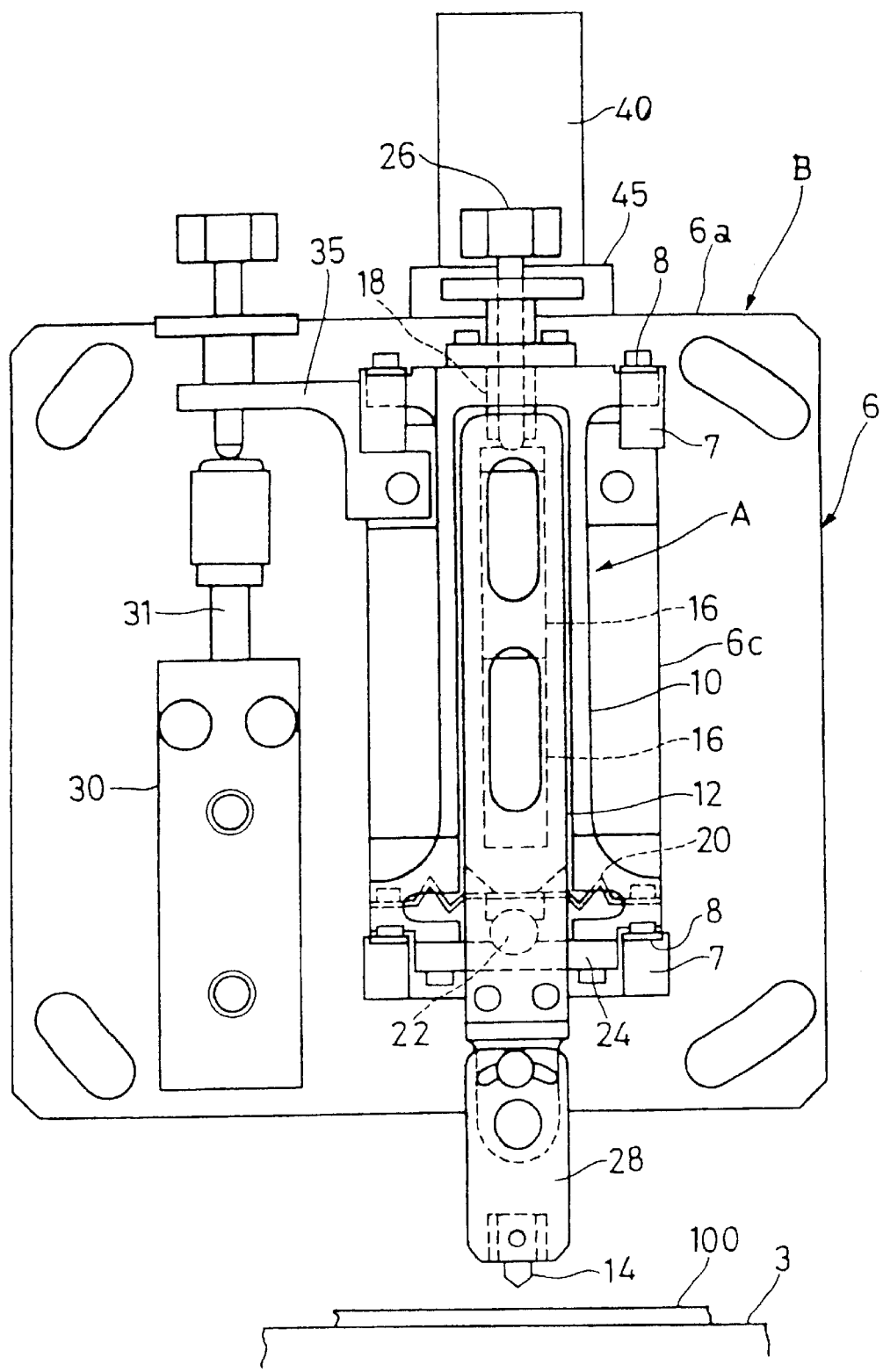
FIG. 3 is a front view, in an enlarged scale, showing an essential portion including a slide mechanism of the scribing apparatus in a state that a scribe body is separated from a work.
Figure 4:
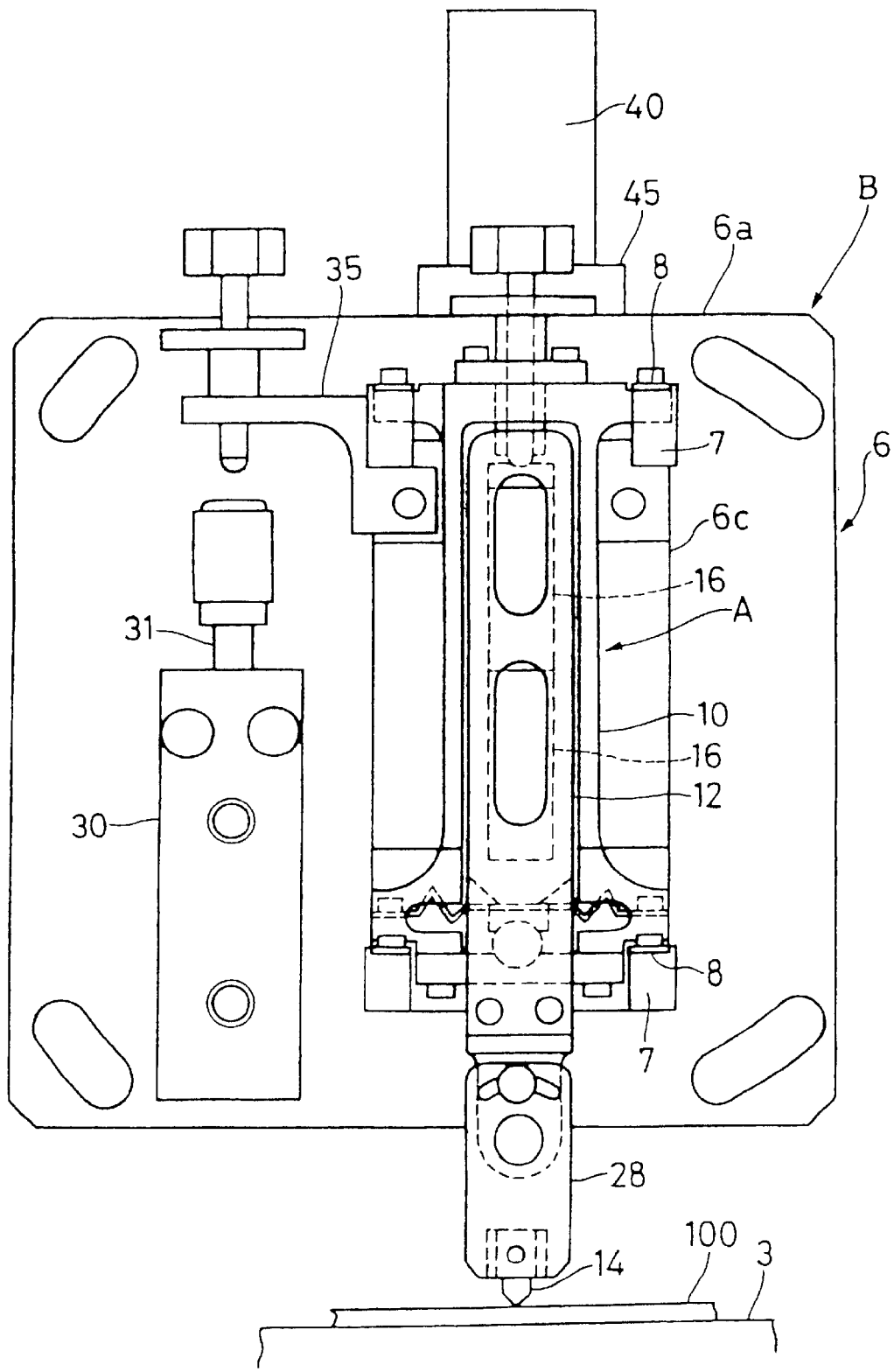
FIG. 4 is a view, corresponding to FIG. 3, showing a state that the scribe body is mounted on a scribing base point of the work.

With reference to FIGS. 1 and 3, an air-cylinder assembly 30 as a contacting/separating device is mounted in a vertical attitude on the vertical front surface of the base plate 6a. The air-cylinder assembly 30 includes a rod 31 facing an L-shaped bracket 35 fixed to the side surface of the body portion 10.

An air-cylinder assembly 40 serving as an impact applying device, constituting a most important element of the present invention, is mounted on the upper end surface of the base plate 6a of the slide mechanism 6. The air-cylinder assembly 40 includes a rod 41 extending downward so as to oppose the upper end surface of the slider 6c.

The scribing apparatus of the present invention further comprises a control unit 50, which is shown only in FIG. 2 as a control device. This control unit 50 controls the operations of the vacuum mechanism, the rotation mechanism 2, the driving mechanisms 4d, 4e of the X-Y stage 4, the vibration generating member 16, the air-cylinder assemblies 30 and 40, and the like.

The scribing apparatus of the structure mentioned above is operated in the following manner.

First, the work (workpiece) 100 is positioned on the horizontally arranged table 3 to be set horizontally. In the initial state, the cutter 14 of the scribe body A is positioned apart from the work 100 in the horizontal direction.

Under this state, when a start button of the control unit 50 is pushed to an ON-state, the control unit 50 executes the control to make the scribing apparatus operate in the following manner:

First of all, the vacuum mechanism is driven to suck up the work 100. The air-cylinder assembly 30 is driven simultaneously or near this time to expand upward the rod 31 of the air-cylinder assembly 30 to thereby lift up the scribe body A through the bracket 35 (refer to FIG. 3).

In the next step, the driving mechanisms 4d and 4e of the X-Y table 4 are operated to move the movable tables 4b and 4c, and according to this motion, the scribe body A is moved to a position just above a scribing base (or starting) point X (FIG. 8) of the work 100, in other words a position confronting the scribing base point X with the scribe body A being positioned above from the surface of the work 100. This scribing base point X is separated from the edge portion of the work 100 and also is apart from the rotational center R of the rotation mechanism 2.

As mentioned above, after the cutter 14 of the scribe body A has been positioned just above the scribing base point X on the surface of the work 100, the air-cylinder assembly 30 is operated to move backward the rod 31, and the scribe body A is lowered by its dead weight and is rested on the scribing base point X on the surface of the work 100.

Then, the air-cylinder assembly 40 is driven to expand downward the rod 41 thereof to beat or tap (apply an impact to) the slider 6c of the scribe body A. The impact applied to the slider 6c is transferred to the body portion 10 through the plate spring 8 and then to the cutter 14 through the holder 12 and the attachment 28. The impact applied to the cutter 14 forms a vertical crack as a base crack to the scribing base point X on the surface of the work 100.

Figure 8:
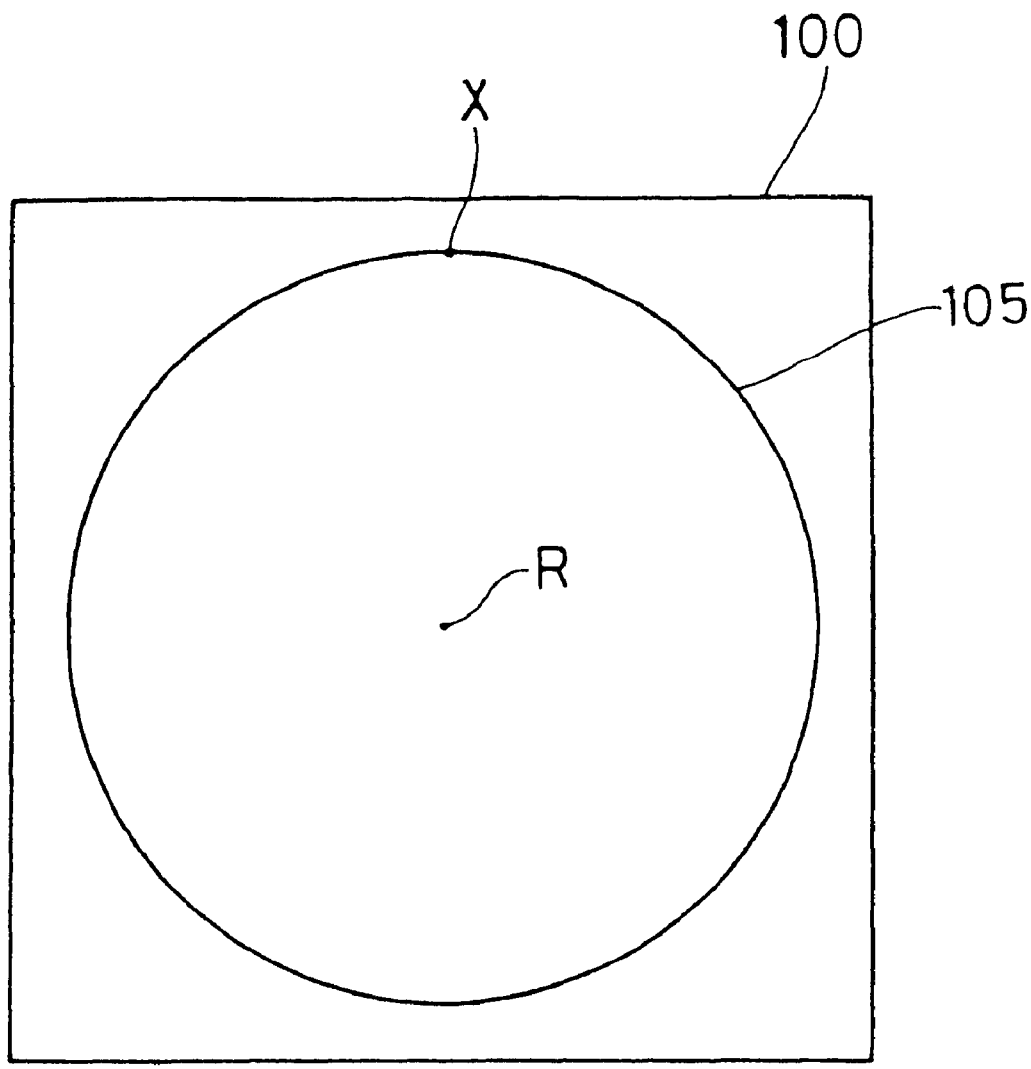
FIG. 8 is a plan view of a scribe line scribed by the scribing apparatus of the present invention.

In the further next step, the two vibration generating members 16 are applied with in-phase high-frequency voltages and the rotation mechanism 2 is driven to move the cutter 14 along the (predetermined) circular locus on the surface of the work 100 to thereby form the scribe line 105 having a circle shape (a closed curve contour) as shown in FIG. 8. This scribing operation is finished at the time when the cutter 14 returns to the position of the scribing base point X.

As mentioned above, according to the present invention, since the scribing base point X is set to a portion apart from the edge portion of the work 100, the scribe line 105 can be formed or scribed in a short time, and that is, the work of scribing from the edge portion of the work 100 to the scribing base point X of the circular scribe line 105 can be eliminated.

The formation of the scribe line 105 will be explained further in detail below. A pressing force (static pressure) is always applied to the cutter 14 against the surface of the work 100 to be scribed, and this pressing force is generated by the dead weight of the scribe body A. The vibration generating members 16 are periodically expandable (telescopic expansion/shrinkage motion) in the axial direction thereof in response to the high frequency voltage, and a vibration of the holder 12 caused by the telescopic motion of the vibration generating members 16 is transmitted to work 100 through the cutter 14. As a result, the scribe line 105 having the vertical crack is formed on the surface of the work 100.

The vertical crack caused by the vibration is hard to generate without an initial crack, but as mentioned above, since the base crack as an initial crack is preliminarily formed on the scribing base point X by the impact of the cutter 14, the growth of the vertical crack is facilitated by the vibration, and hence, a stable scribe line is scribed.

Upon the completion of the formation of the scribe line 105 on the surface of the work 100 by the cutter 14, the application of the high frequency voltage to the vibration generating members 16 is stopped, and the air-cylinder assembly 40 is then driven to push upward the body portion 10 of the scribe body A, thus separating the cutter 14 from the work surface.

The air-cylinder assembly 40 continues to press the scribe body A against the work 100 after extending the rod 41 thereof to apply the impact to the scribe body A. In the scribing process, the cutter 14 is pressed against the work surface by a static force as a sum of the dead weight of the scribe body A and the force of the air-cylinder assembly 40. The rod 41 of the air-cylinder assembly 40 is returned upward upon completion of the scribing operation.

The work 100 after the scribe line 105 has been scribed is removed from the table 3 and broken along the scribe line 105 by a breaking device, not shown, thus obtaining a circular product.

It is to be noted that the present invention is not limited to the described embodiment and many other changes and modifications may be made without departing from the scopes of the appended claims. For example, in the embodiment mentioned above, the rod of the air-cylinder assembly 40 may be returned upward just after applying the impact to the work, and in such case, the cutter 14 will be pressed against the work 100 during the scribing process by the static pressure of only the dead weight of the scribe body A. The vibration generating member 16 may operate to generate the vibration before the air-cylinder assembly 40 applies an impact to the cutter 14 or before the cutter 14 is rested on the work 100.

The impact of the air-cylinder assembly 40 may be applied to the body portion 10 in place of the slider 6c.

What is claimed is:

1. A method of forming a scribe line on a surface of a work by using a scribing apparatus having a scribe body provided with an abutment member having a sharpened tip, a vibration generating device for applying a vibration to the abutment member, and an impact applying device for applying an impact to the scribe body, wherein a base crack is formed on a scribing base point apart from an edge portion of the surface of the work, and the scribe line is formed with the base crack being an initial crack of cracks forming the scribe line, and the base crack is formed by applying an impact to the scribe body with use of said impact applying device.

2. The scribing method according to claim 1, wherein the abutment member is moved directly above the scribing base point by relatively moving the scribe body along the work surface in a state separated therefrom, the scribe body is then lowered to allow the tip of the abutment member to abut against the scribing base point by a dead weight of the scribe body, and thereafter, the impact is applied to the scribe body with use of said impact applying device.

3. The scribing method according to claim 1, wherein the scribing base point substantially accords with a scribing finishing point so as to describe a closed curve line.

4. A scribing apparatus for forming a scribe line on a surface of a work comprising:

a scribe body provided with an abutment member having a sharpened tip and a vibration generating device for applying a vibration to the abutment member;

a support member for supporting the scribe body to be movable in a direction crossing the surface of the work; and an impact applying device for applying an impact to the scribe body so as to form a base crack on a scribing base point apart from an edge portion of the surface of the work, and the scribe line is formed with the base crack being an initial crack of cracks forming the scribe line.

5. The scribing apparatus according to claim 4, wherein the impact applying device comprises an air-cylinder assembly supported by the support member, the air-cylinder assembly having a rod having an end portion to be brought into contact with the scribe body to thereby apply the impact to the abutment member.

6. The scribing apparatus according to claim 4, further comprising:

a positioning device for moving one of the scribe body and the work in a direction along the surface of the work so as to locate the abutment member of the scribe body on a position at which the abutment member confronts a scribing base point formed at a portion apart from an edge portion of the work surface;

a contacting/separating device for contacting or separating the sharpened tip of the abutment member to or from the work surface by moving one of the scribe body and the work in a direction crossing the work surface;

a moving device for moving at least one of the scribe body and the work to relatively move the abutment member along a predetermined line to be scribed on the work surface; and a control device operatively connected to the contacting/separating device, the positioning device, the impact applying device, the moving device, and the vibration generating device to control the operations thereof to describe the predetermined scribe line on the work surface, wherein the control device controls the contacting/separating device and the positioning device so as to oppose the abutment member to the scribing base point on the work surface while separating the abutment member from the work surface, controls the contacting/separating device to abut the sharpened tip of the abutment member against the work surface, controls the impact applying device so as to apply the impact to the scribe body, and controls the moving device so as to describe a predetermined scribe line on the work surface while controlling the vibration generating device to apply the vibration to the abutment member.

* * * * *